Feb. 2, 1932.  F. C. RUSSELL ET AL  1,843,787
MAGNETO AND LIKE SHAFT COUPLING
Filed March 22, 1928    2 Sheets-Sheet 1
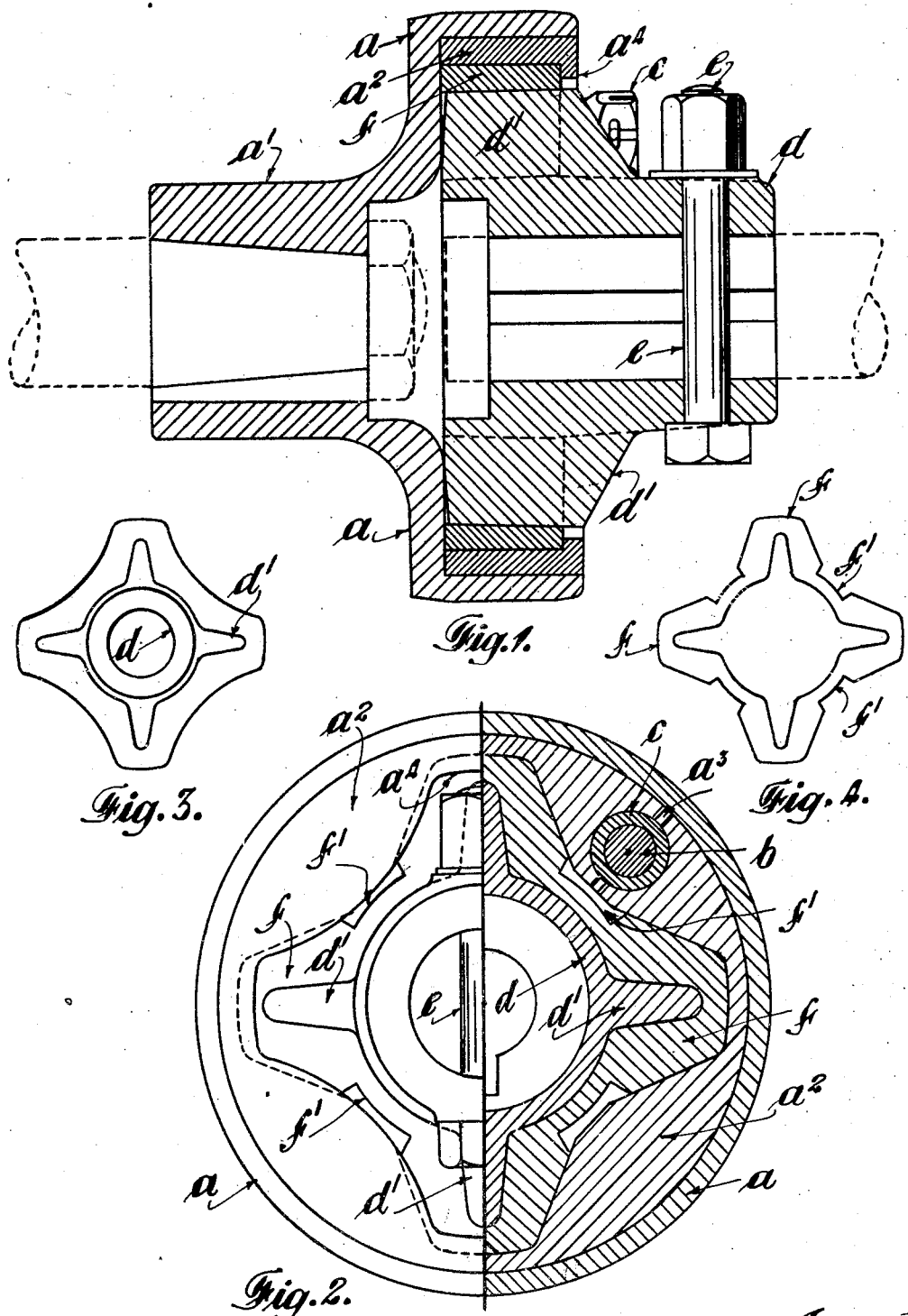

Feb. 2, 1932.    F. C. RUSSELL ET AL    1,843,787
MAGNETO AND LIKE SHAFT COUPLING
Filed March 22, 1928    2 Sheets-Sheet 2

Inventors:
Frederick Clifton Russell.
John Henry Bradbury.
By their Attorney: Walter Gunn Patented Feb. 2, 1932

1,843,787

UNITED STATES PATENT OFFICE

FREDERICK CLIFTON RUSSELL, OF ALTRINCHAM, AND JOHN HENRY BRADBURY, OF ASHTON-ON-MERSEY, ENGLAND

MAGNETO AND LIKE SHAFT COUPLING

Application filed March 22, 1928, Serial No. 263,798, and in Great Britain October 7, 1927.

This invention refers to magneto and like shaft couplings, and has for its object to provide a construction of coupling which allows of ready adjustment to suit the "timing" of the magneto, and which also provides a flexible "drive" between the driving and driven shafts within wide limits of torque or load without damage to the coupling, while permitting of the necessary power transmission.

According to the invention, the improved coupling comprises an outer cylinder-like member and a hub part in one with such member, a further cylinder-like member neatly fitting within the outer member, said inner member being split transversely, a screwed bolt lying in the split of the inner member, and a conical nut on said bolt for expanding the inner member and causing it to tightly fit the outer member, said inner member having deep recesses on its inner face, a central boss or hub having radial teeth which are flat-sided and slightly tapered, both longitudinally and transversely, and an elastic sleeve closely fitting the said teeth, and contacting with the sides of the recesses in the said inner cylindrical member, the core of the sleeve being of like taper to that of the teeth.

The hub of the outer part of the coupling is secured to one of the shafts to be coupled, usually the magneto shaft, while the said inner central boss or hub is keyed to the other shaft, usually the power shaft.

The elastic sleeve is applied to the teeth of the central hub from that end next the hub of the outer part of the coupling, and said sleeve is slightly shorter than the width of the outer part of the coupling, which is formed with an inturned flange to hold the sleeve in position. The elastic sleeve is preferably formed of a mixture of rubber and fibre, which is proof against petrol, acid or water.

Upon the accompanying drawings,

Fig. 1 is a longitudinal sectional elevation of a coupling constructed according to the invention.

Fig. 2 is a part exterior and part sectional end elevation of the same coupling.

Fig. 3 is an end view of the inner part of the coupling drawn to a reduced scale.

Fig. 4 is an end view of the rubber-fibre sleeve, also drawn to a reduced scale.

Figure 6:
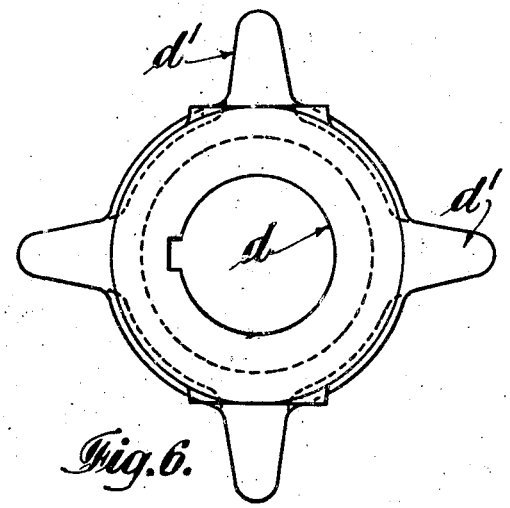

Fig. 6 an end view of such part.

Figure 7:
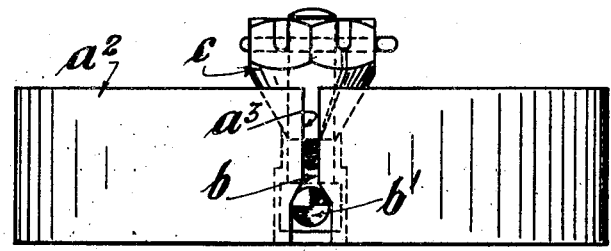

Fig. 7 is a plan of the inner (split ring) portion of the outer part of the coupling.

As shown, the coupling comprises the outer cylindrical shell $a$ in one with a hub $a^1$ for connection to say the magneto shaft. It also comprises the inner ring $a^2$ neatly fitting within the shell $a$. Such ring is split at $a^3$ and provided with a T-headed bolt $b$, lying in the split, whereby, and a split conical-ended nut $c$ engaging a conical seating, the ends of the ring $a^2$ may be separated and the ring expanded to lock with the shell $a$, the parts having been previously adjusted angularly to suit the required "timing" of the magneto. The split in the nut $c$ allows of the nut gripping the bolt when adjusted to fully expand the ring $a^2$.

As shown in Fig. 7, the ends of the ring $a^2$ formed by the split are formed with bevelled shoulders against which a cross pin $b^1$ of the bolt $b$ bears and helps in expanding the ring when the nut $c$ is tightened up.

The inner part of the coupling comprises the boss or hub-like member $d$ suitable for keying, and also, if desired, bolting by bolt $e$ to say the power shaft. In one with said part $d$ are flat-sided and longitudinally and transversely tapered teeth $d^1$, see Figs. 2, 3 and 6. These teeth project radially into recesses forming in the ring $a^2$, the sides of the recesses being flat and inclined, as shown in Fig. 2. Fitting closely over the teeth $d^1$ and filling the space between them and the ring $a^2$ is the rubber-fibre sleeve $f$, see Fig. 4, the sleeve being slightly tapered longitudinally in order to readily pass into position when being assembled.

The sleeve is almost equal in length to the width of the ring $a^2$ and abuts against the small inwardly projecting flange $a^4$ of the ring $a^2$, see Fig. 1, the sleeve being passed over the teeth $d^1$ from the ends which fit next the shell.

Figure 5:
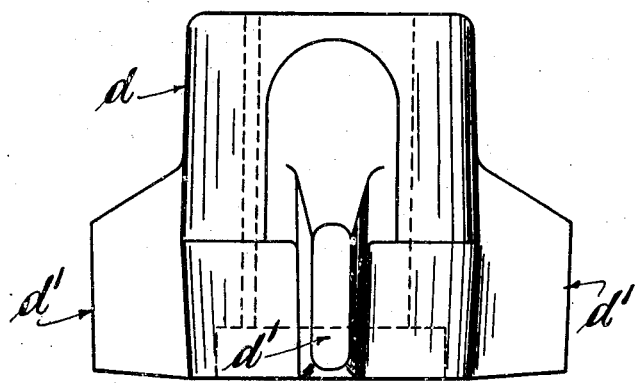
Fig. 5 is a plan of the inner part of the coupling.

To facilitate insertion of the rubber-fibre sleeve, the ends of the teeth $d^1$ are rounded, and to avoid rubbing and to allow of any slight misalignment, the ends of the teeth $d^1$ next the end wall of the shell are slightly bevelled, see Figs. 1 and 5.

In use, the rubber-fibre sleeve allows of the required flexibility between the driving and driven members, while permitting of the necessary power transmission. To facilitate the more ready fitting of the rubber-fibre sleeve between the collar $d$ and ring $a^2$, and also to allow of increased flexibility, the sleeve is formed to a thinner section at points between the teeth $d^1$, thereby leaving spaces or clearances at $f^1$ between itself and the collar $d$.

What we claim as our invention is:—

1. In magneto or like shaft couplings, an outer cylinder-like member and a hub part in one with such member, a further cylinder-like member neatly fitting within the outer member, said inner member being split transversely, a screwed bolt lying in the split of the inner member, and a conical nut on said bolt for expanding the inner member and causing it to tightly fit the outer member, said inner member having deep recesses on its inner face, a central boss or hub having radial teeth which are flat-sided and slightly tapered, both longitudinally and transversely, and an elastic sleeve closely fitting the said teeth, and contacting with the sides of the recesses in the said inner cylindrical member, the core of the sleeve being of like taper to that of the teeth, as set forth.

2. In magneto or like shaft couplings, as claimed in claim 1, an elastic sleeve having circumferential clearances between itself and the inner cylindrical member, at points intermediate of the teeth, as set forth.

3. In magneto or like shaft couplings, an outer cylinder-like member having a hub part for fixing to a shaft, a further cylinder-like member neatly fitting within the outer member and having at one end a small inwardly projecting flange, said inner member being split transversely, a screwed bolt lying in the split of the inner member, and a conical nut on said bolt for expanding the inner member and causing it to tightly fit the outer member, said inner member having deep recesses on its inner face, a central boss or hub having radial teeth which are flat-sided and slightly tapered, both longitudinally and transversely, and an elastic sleeve closely fitting the said teeth, and contacting with the sides of the recesses in the said inner cylindrical member, the core of the sleeve being of like taper to that of the teeth, and the sleeve abutting against the said inwardly projecting flange of the said inner cylinder-like member of the coupling, as set forth.

4. In magneto or like shaft couplings, as claimed in claim 3, a bolt having a T head lying in the split of the inner cylinder-like member, which member has a shoulder on each face of the slit for the bolt head to bear against, and said bolt extending beyond that face of the inner cylinder-like member furthest from the shoulders, and a conical nut on said bolt to engage the said face of the inner member which has complemental recesses for the nut to engage, the bolt and nut thus being furnished with the necessary abutments entirely by the cylinder-like member, as set forth.

In testimony whereof we have signed our names to this specification.

FREDERICK CLIFTON RUSSELL.
JOHN HENRY BRADBURY.